United States Patent
Liu

(10) Patent No.: US 11,768,942 B2
(45) Date of Patent: Sep. 26, 2023

(54) LICENSE-PROTECTED BOOT DEVICE

(71) Applicant: Micron Technology, Inc., Boise, ID (US)

(72) Inventor: Zhan Liu, Cupertino, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/323,430

(22) Filed: May 18, 2021

(65) Prior Publication Data
US 2022/0374521 A1    Nov. 24, 2022

(51) Int. Cl.
*G06F 21/57* (2013.01)
*G06F 21/64* (2013.01)
*G06F 21/79* (2013.01)
*G06F 21/54* (2013.01)

(52) U.S. Cl.
CPC ............ *G06F 21/575* (2013.01); *G06F 21/54* (2013.01); *G06F 21/572* (2013.01); *G06F 21/64* (2013.01); *G06F 21/79* (2013.01); *G06F 2221/0751* (2013.01)

(58) Field of Classification Search
CPC ............. G06F 21/44–445; G06F 21/54; G06F 21/57–575; G06F 21/64–645; G06F 21/79; G06F 2221/0751; H04L 63/08; H04L 63/0823; H04L 63/0876
See application file for complete search history.

(56) References Cited

U.S. PATENT DOCUMENTS

2014/0040605 A1\*  2/2014  Futral ................... G06F 21/572
                                                            713/2
2022/0092203 A1\*  3/2022  Khatri ..................... G06F 3/061

FOREIGN PATENT DOCUMENTS

WO    WO-2022044664 A1 \*  3/2022

\* cited by examiner

*Primary Examiner* — Kevin Bechtel
(74) *Attorney, Agent, or Firm* — Greenberg Traurig

(57) ABSTRACT

The disclosed embodiments relate to secure booting of memory device. The disclosed embodiments generate measurement data associated with a memory device. Next, the disclosed embodiments read a golden measurement from a secure location in the memory device, the golden measurement generated based on a version of the data associated with the memory device, and therefore it is unique to the device. The disclosed embodiments validate the golden measurement value using a public key and determine whether the golden measurement is equal to the measurement data. The golden measurement value can also be saved in a write protected area which can only be changed by a secure write command, therefore, it is imutable by others. Finally, the disclosed embodiments continue a boot process when the golden measurement is equal to the measurement data.

17 Claims, 6 Drawing Sheets

LICENSE-PROTECTED BOOT DEVICE

TECHNICAL FIELD

At least some embodiments disclosed herein relate to memory devices in general, and more particularly, but not limited to utilizing a secure memory device to control the booting of a computer system.

BACKGROUND

A memory subsystem can include one or more memory devices that store data. The memory devices can be, for example, non-volatile memory devices and volatile memory devices. In general, a host system can utilize a memory subsystem to store data at the memory devices and to retrieve data from the memory devices.

BRIEF DESCRIPTION OF THE DRAWINGS

The embodiments are illustrated by way of example and not limitation in the figures of the accompanying drawings in which like references indicate similar elements.

DETAILED DESCRIPTION

Figure 1:
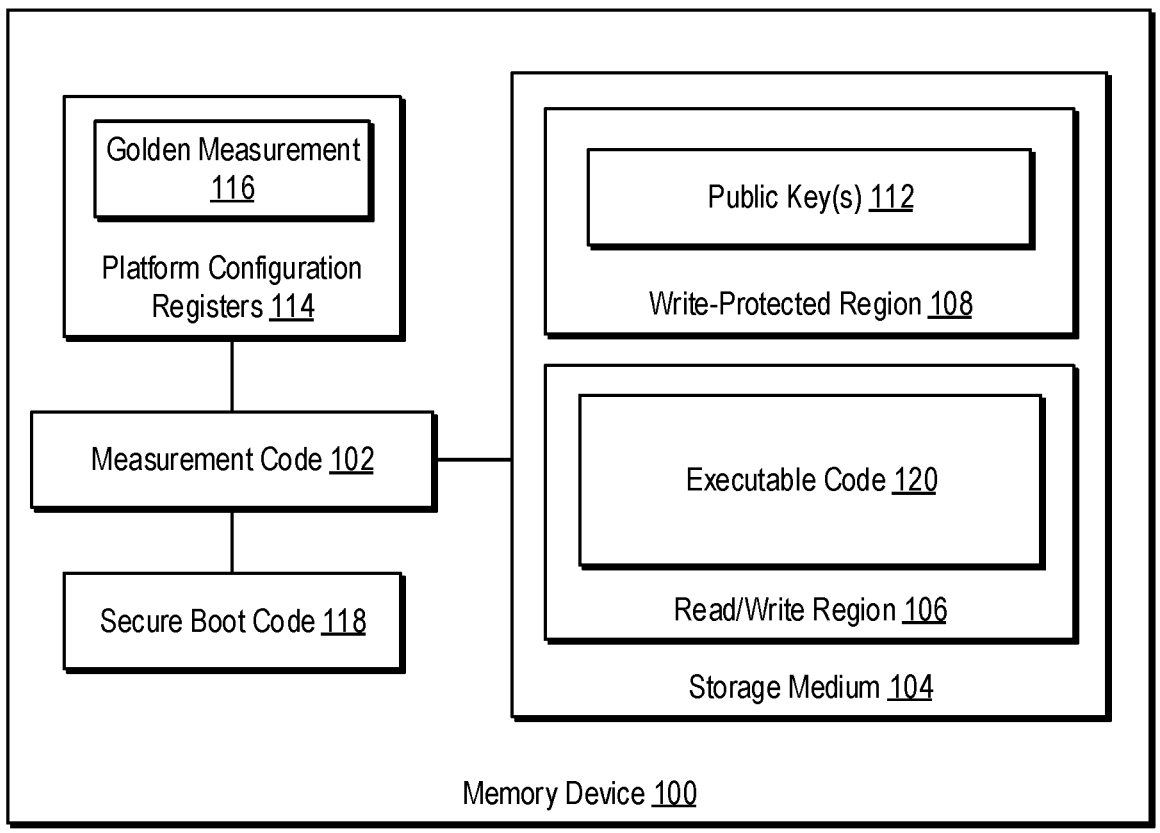
FIG. 1 is a block diagram of a memory device according to some embodiments of the disclosure.

In the following embodiments, a memory device can include software and/or hardware to support an auto measurement capability, the ability to set up measurable locations and data, the ability to save a public key in a write-protected area during manufacture; one or more platform Configuration Register (PCR) locations; and a write protection system for boot images (e.g., Das U-Boot).

In the embodiments, a corresponding measure can be generated using a private key of a server and is saved in a Platform Configuration Register (PCR) of the memory device. In some embodiments, the initial setup can be performed by a manufacturer during the manufacturing of a device. However, in alternative embodiments, a customer (e.g., an original equipment manufacturer) can perform the process. In addition to the measurement, a public key can be written to a write-protected area of the memory device.

During an initial setup (e.g., first boot after manufacturing), a memory device can measure software (including version information), firmware (including version information), and driver/hardware signature features (e.g., processor identifiers, fully-quality domain names, media access control addresses, etc.), which are unique for the computer or computer system. An auto measurement feature of the memory device can then be enabled during the initial setup, such that the memory device will perform the same measurement upon booting after the initial setup. In some embodiments, this auto-measurement feature can only able to be disabled via a secure command (e.g., a signed command from the owner of the public key stored in the write-protected area).

When a memory device boots up again, it can perform the measurement (i.e., measures the same features measured during the initial setup) to obtain a current measurement value. The memory device can then read the "golden" measurement from the PCR and can validate the measurement using the public key to verify the signature associated with the PCR contents.

If the current measurement value matches the confirmed golden measurement, the memory device can continue the boot process. If not, the memory device can halt the boot process and can perform, as one non-limiting example, a recovery operation to restore the memory device to a trusted state.

In some embodiments, the measurement may only be performed on the boot image and hardware signature features. Thus, the measurement verification can be performed early in the boot process when network access is generally unavailable. Thus, the measurement can be used as a license to operate the memory device since the license will generally disable the entire access to the memory device. Further, since the private key is maintained secretly, only the owner can control the distribution of licenses.

The use of public key infrastructure (PKI) to license hardware in an early boot stage further provides the following advantages. First, the drawbacks, unavailability, and costs of a license server are avoided since such a license server is not needed. Second, the public key cannot be attacked since it is in a write-protected area. Third, the disclosed embodiments bypass a higher-level license check since the measure and check are done by the device on boot. Fourth, the entire process can be automated and does not require user input.

FIG. 1 is a block diagram of a memory device according to some embodiments of the disclosure.

In an embodiment, a memory device (100) can comprise a non-volatile memory device such as a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD).

In an embodiment, the memory device (100) includes a storage medium (104). In an embodiment, a storage medium (104) can comprise an array of memory cells. In one embodiment, a storage medium (104) can comprise an array of NAND Flash cells. One type of memory cell, for example, single-level cells (SLC), can store one bit per cell. Other types of memory cells, such as multi-level cells (MLCs), triple-level cells (TLCs), quad-level cells (QLCs), and penta-level cells (PLCs), can store multiple bits per cell. In some embodiments, the storage medium (104) can include one or more arrays of memory cells such as SLCs, MLCs, TLCs, QLCs, PLCs, or any combination of such. In some embodiments, a memory device (100) can include an SLC portion, an MLC portion, a TLC portion, a QLC portion, and/or a PLC portion of memory cells. The memory cells of the storage medium (104) can be grouped as pages that can refer to a logical unit of the memory device used to store data. With some types of memory (e.g., NAND), pages can be grouped to form blocks.

Although non-volatile memory devices such as 3D cross-point type and NAND type memory (e.g., 2D NAND, 3D NAND) are described, the memory device 100 can be based on any other type of non-volatile memory, such as read-only memory (ROM), phase-change memory (PCM), self-selecting memory, other chalcogenide-based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide-based RRAM (OxRAM), negative-or (NOR) flash memory, electrically erasable programmable read-only memory (EEPROM), etc.

In the illustrated embodiment, the storage medium (104) includes two regions: a write-protected region (108) and a read/write region (106). The disclosed embodiments are not limited to only two regions, and the illustrated regions are exemplary. In an embodiment, the write-protected region (108) comprises a region of the storage medium (104) that cannot be written to by external devices (e.g., a host processor). By contrast, the read/write region (106) can be read from and written to by such external devices.

In an embodiment, the read/write region (106) can store executable code (120) as well as data (not illustrated). In an embodiment, executable code (120) comprises a bootloader or similar boot code.

In an embodiment, the write-protection region (108) can store one or more public keys (112). In an embodiment, public keys (112) comprise a public key portion of a public-private key pair. In one embodiment, public keys (112) can be generated by a manufacturer of the memory device (100), a customer or owner of the memory device (100), or another authorized party, as discussed further herein. In the illustrated embodiment, public keys (112) can be written to the write-protected region (108) only during manufacturing or via secure commands (e.g., authenticated commands).

In the illustrated embodiment, the memory device (100) includes a secure boot code (118). In one embodiment, a secure boot code (118) can comprise a secure first-stage bootloader. In some embodiments, secure boot code (118) can comprise a second-stage bootloader as well. In some embodiments, secure boot code (118) can be stored in a dedicated storage medium (e.g., EEPROM) that cannot be written to. In other embodiments, secure boot code (118) may be stored in the storage medium, such as in the write-protected region (108). In some embodiments, secure boot code (118) can be configured to perform or manage some or all of the blocks described in FIGS. 3 and 4. In some embodiments, secure boot code (118) comprises the first executable code executed by the memory device (100) on power-on.

In the illustrated embodiment, a measurement code (102) is communicatively coupled to the secure boot code (118) and a storage medium (104). In some embodiments, measurement code (102) comprises software to measure data associated with the memory device (100). Details of this measuring are described in more detail in the following Figures and, in particular, blocks 202, 304, and 404, the disclosure of which is incorporated herein. In some embodiments, measurement code (102) can be stored in a dedicated storage medium (e.g., EEPROM) that cannot be written to. In other embodiments, measurement code (102) may be stored in the storage medium, such as in the write-protected region (108).

In some embodiments, measurement code (102) is additionally configured to compare instant measurements of code with stored measurements. In one embodiment, the memory device (100) includes a set of platform control registers. In the illustrated embodiment, PCR registers (114) comprise non-volatile storage locations written to during manufacturing or in response to secure commands. In some embodiments, PCR registers (114) can store a golden measurement (116). In an embodiment, a golden measurement (116) comprises a hash or other value describing data associated with the memory device (100). Details of generating and storing a golden measurement (116) in PCR registers (114) are provided in the discussion of FIG. 2, which is incorporated herein. In some embodiments, PCR registers (114) can store other sensitive data such as digital signatures. In one embodiment, PCR registers (114) can store a digital signature associated with the golden measurement (116). In other embodiments, the golden measurement (116) can be stored in write-protected region (108). In such a scenario, the golden measurement (116) can be unsigned.

As will be discussed further herein, secure boot code (118) and measurement code (102) operate to control the boot process beyond the first-stage (and, in some embodiments, second-stage) bootloaders. Details of the interactions of these components are described more fully in connection with the following flow diagrams of FIGS. 2 through 4. In some embodiments, secure boot code (118) and measurement code (102) can be executed by a controller, such as a controller (506).

Figure 2:
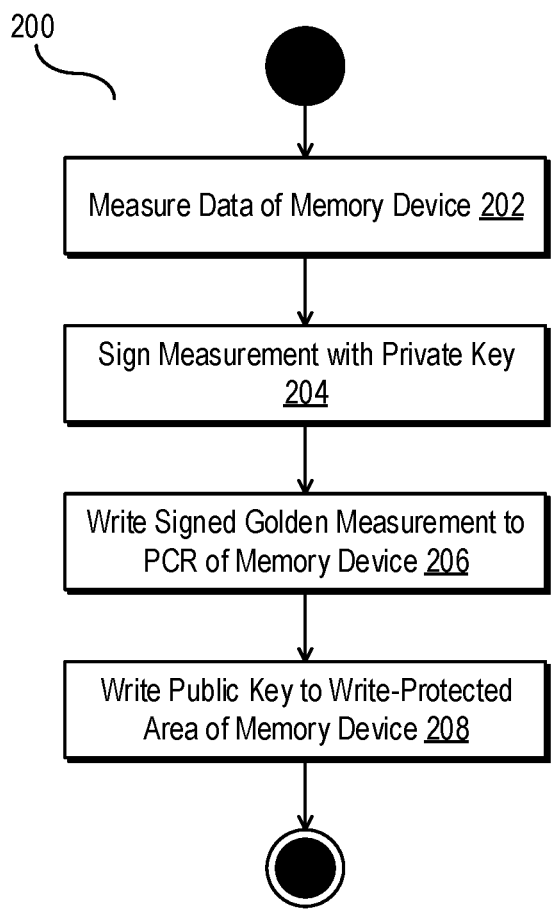
FIG. 2 is a flow diagram illustrating a method for initializing a memory device for secure booting according to some embodiments of the disclosure.

FIG. 2 is a flow diagram illustrating a method for initializing a memory device for secure booting according to some embodiments of the disclosure. In an embodiment, method 200 can be performed by a centralized computing system. For example, a server operated by a manufacturer of a memory device can execute method 200 during the manufacturing or initial configuration of a memory device.

In block 202, method 200 comprises measuring data of a memory device.

In an embodiment, measuring data of the memory device comprises measuring software or firmware of the memory device. In one embodiment, software or firmware can comprise executable code and data stored in a storage array of the memory device. In some embodiments, the software or firmware can be stored in other non-volatile locations of the memory device. In one embodiment, measuring data can further comprise including a version number or other identifier in the measurement. In an embodiment, measuring data of the memory device can comprise measuring driver or hardware signature features. In an embodiment, driver or hardware signature features can comprise a central processing unit (CPU) identifier (cpu_id), fully qualified domain name (FQDN), media access control (MAC) address, or similar unique values. In some embodiments, method 200 can measure some or all of the aforementioned values. In some embodiments, method 200 measures this data with respect to memory device hardware. In some embodiments, method 200 can also measure the data from a computer system that includes the memory device (e.g., a laptop, mobile device, etc.).

In an embodiment, the software and firmware measured in block 202 can comprise known software or firmware installed by a manufacturer during the manufacturing of the memory device. In this regard, the software and/or firmware can be trusted software and/or firmware. Thus, the measurement in block 202 can be deemed a golden measurement associated with a trusted software and/or firmware.

In an embodiment, measuring comprises combining all values to be measured (e.g., software, firmware, version information, driver/hardware signature features) and generating a measurement value using the values to be measured. In an embodiment, generating a measurement value from values to be measured can comprise computing a hash or other result using a one-way function such as a SHA-512, SM3, or similar secure hashing function. In such an embodiment, the data to measure is used as the input into a secure hashing function and the (generally fixed-length) output of the secure hashing function can be used as the measurement.

In some embodiments, method 200 can measure a second-stage boot loader code or other similar code. In this embodiment, as will be described in FIG. 4, a first-stage bootloader can measure the second-stage bootloader code to validate the second-stage bootloader prior to proceeding.

In block 204, method 200 can comprise signing the measurement generated in block 202 with a private key.

In an embodiment, the private key can comprise a private key of a server (e.g., a manufacturer). In an embodiment, the private key is part of a public/private key pair generated using an asymmetric or public-key cryptosystem. For example, a Rivest—Shamir—Adleman (RSA) or Elliptic Curve Cryptography (ECC) key generation algorithm can be used to generate public/private key pairs. In some embodiments, method 200 can comprise registering the public key of the key pair with a certificate authority (CA) or similar trusted entity.

In an embodiment, method 200 signs the measurement with the private key. In an embodiment, method 200 can use a corresponding signature algorithm to generate a digital signature associated with the measurement, the measurement comprising a digest output of a secure hashing function applied to data to measure, as discussed above. For example, method 200 can use an RSA signature algorithm or Elliptic Curve Digital Signature Algorithm (ECDSA) to generate a digital signature using the measurement and the private key.

In some embodiments, block 204 can be optional. In such embodiments, method 200 can instead write the measurement to a write-protected region of memory. In some embodiments, this write-protected region is prevented from writing unless an authenticated command is received. In an embodiment, an authenticated command comprises a command signed using a private key of a server corresponding to the public key written in block 208, discussed below.

In block 206, method 200 can comprise writing the signed measurement to a platform configuration register (PCR) of the memory device.

In an embodiment, a PCR can comprise a secure register or set of registers in the memory device. In some embodiments, PCR registers can be located in a secure region of the memory device (e.g., a trusted platform module or similar secure enclave). In other embodiments, PCR registers can comprise registers writeable only by the controller of the memory device and not in response to external commands.

In block 208, method 200 can comprise writing the public key (of the public-private key pair discussed in block 204) to a write-protected region of the memory device.

In an embodiment, the public key written in block 208 can comprise the public key corresponding to the private key used to generate the signature in the preceding steps. In an embodiment, method 200 can write the public key to a PCR. In other embodiments, method 200 can write the public key to a dedicated region of a storage array. In this embodiment, a controller can configure the dedicated region as a write-protected region. As used herein, a write-protection region can comprise any region of a storage medium of a memory device that is not writeable by external devices. In some embodiments, a write-protected region can comprise a region that is only writable by certain firmware instructions that are internal to a controller of the memory device.

As illustrated above, method 200 can generate trusted and unique data for each memory device. In an embodiment, method 200 concatenates trusted code (software/firmware) along with values unique to a device (e.g., CPU identifiers, FQDN, MAC address) to generate a unique signature for each memory device. Method 200 can then sign measurement to provide a validation of the measurement by the manufacturer, thus verifying the measurement during manufacturing when security is ensured. Finally, method 200 provides its public key in an on-device location to enable the use of the measurement and signature as is described next.

Although the foregoing examples are described as being performed by a manufacturer, in some embodiments, method 200 can be performed by the owner of the memory device, such as an original equipment manufacturer (OEM). In some embodiments, the memory device can be equipped with a public key of the owner. The owner can then sign commands using the corresponding private key. The memory device can thus authenticate an owner's commands using the public key (e.g., by verifying a signature generated using a private key). In an embodiment, method 200 can be triggered by an owner issuing a secure command instructing the memory device to re-initialize the PCR and public key. In an alternative embodiment, a host processor can perform steps 204 and 206 and provide the measurement and signature to the memory device using a secure command.

Figure 3:
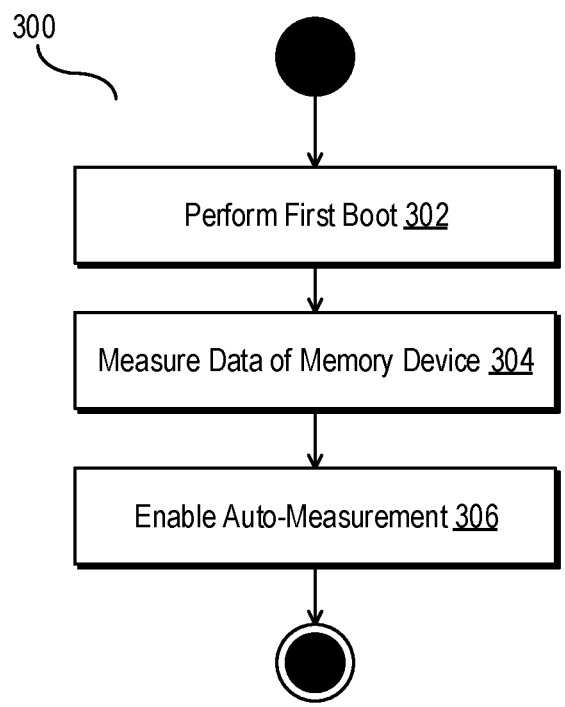
FIG. 3 is a flow diagram illustrating a method for performing an initial boot of a memory device according to some embodiments of the disclosure.

FIG. 3 is a flow diagram illustrating a method for performing an initial boot of a memory device according to some embodiments of the disclosure. In an embodiment, method 300 can be executed by firmware executing on a memory device.

In block 302, method 300 can comprise performing a first boot of a memory device.

In an embodiment, a first boot can comprise the first time a memory device is powered on after being released from manufacturing. In an embodiment, a manufacturer can set a configuration setting indicating that the memory device has not been booted after being released from manufacturing. For example, such a setting can be stored in a PCR or other secure location. In an embodiment, firmware in the memory device is configured to read the setting upon boot and can determine if the current boot is the first boot. In an embodiment, after block 306, method 300 can comprise disabling, deleting, or otherwise removing the configuration setting, indicating a boot is the first boot. Thus, in an embodiment, method 300 is executed once during the lifetime of a memory device, the initial boot after being released from manufacturing. In an alternative embodiment, method 300 can be executed multiple times. In such a scenario, a memory device can provide a secure mechanism to enable a resetting of the configuration setting, indicating the next boot is the first boot. As an example, in some embodiments, a memory device can support authenticated commands from a host processor, which allows an authenticated host processor to change the configuration setting. In such an example, an owner (e.g., purchaser) of a memory device can "reset" the memory device to a factory default state and thus re-execute method 300 as needed.

In block 304, method 300 can comprise measuring data of the memory device.

In an embodiment, block 304 can be performed using the same techniques described in the description of block 202. That is, method 300 can measure the software, firmware, and/or signature features of the memory device. Notably, the contents of these values may differ from those measured in block 202; however, in an embodiment, the location and type of data measured in block 304 are identical to those measured in block 202. For example, method 200 can measure the boot loader code installed during manufacturing, while method 300 can measure the boot loader code currently stored on the memory device. As will be discussed, comparisons between these measurements can be used to selectively boot the memory device.

In some embodiments, method 300 can optionally include using the measurement to determine whether to proceed to block 306. Specifically, in some embodiments, method 300 can execute blocks 406 and 408 from FIG. 4 after executing block 304. In this embodiment, method 300 can determine whether to proceed to block 306 based on the comparison of the measurement in block 304 and the golden measurement retrieved in blocks 406 and 408. In essence, method 300 can selectively stop all operations if the golden measurement does not match the measurement performed in block 304.

In block 306, method 300 can comprise enabling an auto-measurement feature of a memory device.

In an embodiment, a memory device can include an automatic measurement setting. Such a setting can be stored in a secure location (e.g., PCR or write-protected storage area). In an embodiment, the automatic measurement setting can comprise a flag or other binary indicator that causes a memory device to perform a measurement upon booting up. If the automatic measurement setting is disabled, the memory device can bypass measurement and proceed to boot. If, however, the automatic measurement setting is enabled, the memory device will perform a measurement of data associated with the memory device and use this measurement to determine whether to continue the boot process, as discussed more fully in connection with FIG. 4.

Figure 4:
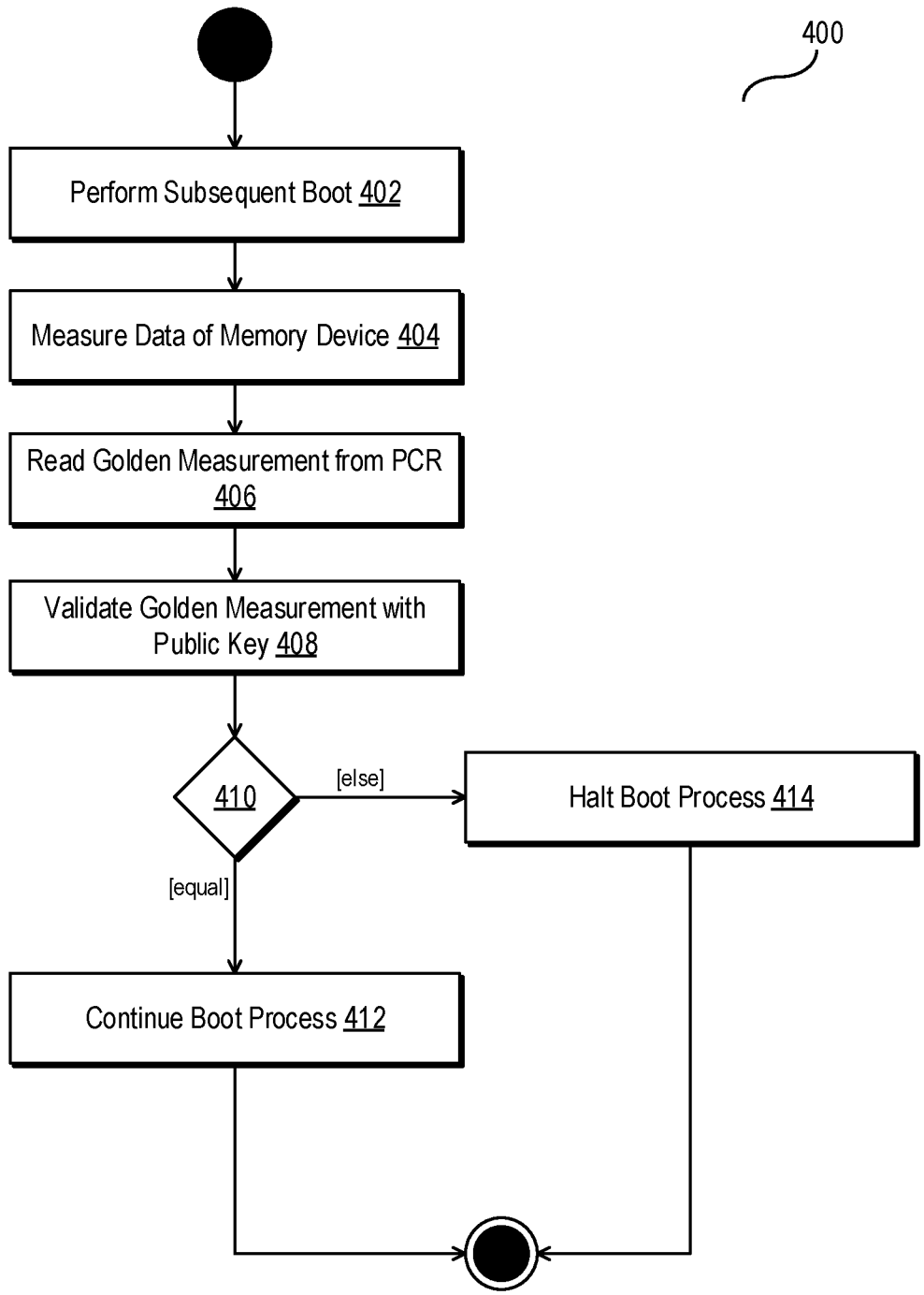
FIG. 4 is a flow diagram illustrating a method for performing a secure boot of a memory device according to some embodiments of the disclosure.

FIG. 4 is a flow diagram illustrating a method for performing a secure boot of a memory device according to some embodiments of the disclosure. In some embodiments, method 400 can be executed by a memory device via, for example, the firmware of the memory device.

In block 402, method 400 can comprise performing a subsequent boot.

As used herein, a subsequent boot refers to a boot event occurring after the initial boot in block 302. A subsequent boot can comprise a cold reboot, warm or hot reboot, hard reboot, power-on reset, or any other mechanism where the power to a memory device is interrupted. After such a subsequent boot, method 400 can comprise executing a first stage bootloader (FSB) or similar initial boot layer. In some embodiments, method 400 can be executed as part of an FSB or similar early-stage boot loader. Notably, in some embodiments, method 400 can be executed early in the boot process before the memory device can communicate with external devices or networks.

In block 404, method 400 can comprise measuring data of the memory device.

In an embodiment, block 404 can be performed using the same techniques described in the description of block 202. That is, method 400 can measure the software, firmware, and/or signature features of the memory device. Notably, the contents of these values may differ from those measured in block 202; however, in an embodiment, the location and type of data measured in block 404 are identical to those measured in block 202. For example, method 200 can measure the boot loader code installed during manufacturing, while method 400 can measure the boot loader code currently stored on the memory device. As will be discussed, comparisons between these measurements can be used to selectively boot the memory device.

In block 406, method 400 reads the measurement from a PCR.

In the illustrated embodiment, the value read in block 406 comprises the value written in block 206. In brief, the measurement read in block 406 comprises a golden measurement of the same data measured in block 402. In the illustrated embodiment, method 400 can be executed early in the boot sequence and by a trusted portion of a controller and/or firmware. This, in an embodiment, method 400 can be certain that the measurement in block 404 and the reading of the PCR are secure and not subject to tampering.

In block 408, method 400 validates the golden measurement with a public key.

In an embodiment, method 400 reads the public key from a write-protected area of the memory device. In an embodiment, the public key comprises the key written in block 208 of FIG. 2. In some embodiments, the public key can be associated with a manufacturer of the memory device. In other embodiments, the public key can be associated with a customer (e.g., OEM) or other trusted entity. Since method 200 writes the public key to a write-protected region of the memory device, method 400 can ensure that only a valid public key is used in block 408.

In an embodiment, method 400 loads the public key from the write-protected area and reads a signature associated with the golden measurement. In an embodiment, method 400 can read the signature from a designated location such as a PCR or from the write-protected area. Thus, in block 408, method 400 obtains a public key and a digital signature associated with the golden measurement read in block 406. As discussed above, in some embodiments, a signature is omitted and in such an embodiment, the golden measurement is stored in the write-protected region of the memory device. In either scenario, method 400 can prevent tampering with the golden measurement by the foregoing security considerations.

In an embodiment, method 400 validates the golden measurement by validating the digital signature using the public key. Specifically, method 400 uses the measured data (block 406) as a hash value. Method 400 can then verify the signature to compute an expected hash from the golden measurement.

In some embodiments, method 400 may terminate (e.g., proceed directly to block 414) if it is unable to validate the digital signature (and thus golden measurement) in block 408.

In block 410, method 400 determines whether the golden measurement and the measurement performed in block 404 are equal. As discussed above, in some embodiments, the measurement performed in block 404 yields a first hash value, and the golden measurement read in block 406 comprises a second hash value. After validating that the second hash value (block 408), method 400 can then perform a bit-wise comparison between the first and second hash to determine if the hashes are equal.

In block 412, method 400 has determined that the first hash (block 404) and second hash (block 406) are equal. In this scenario, method 400 proceeds to continue to the boot process. In one embodiment, the first and second hash can be computed based on a next-stage (e.g., second stage) bootloader. Thus, in this embodiment, method 400 can transfer control to the next-stage bootloader after validating the hashes.

In block 414, method 400 has determined that the first hash (block 404) and second hash (block 406) are not equal. In this scenario, the current contents of the data measured (e.g., a next-stage bootloader) is not equal to the version used to create the golden measurement. In this scenario, method 400 can halt the boot process.

In an embodiment, as part of block 414, method 400 can terminate the power-on procedure of the memory device.

Alternatively, or in conjunction with the foregoing, method 400 can initiate a recovery process to restore the memory device to a bootable state. In one embodiment, method 400 can load a trusted code (e.g., bootloader code) from a secure (e.g., write-protected) location and replace the code measured in block 404 with the trusted code. Method 400 can then restart from block 404. In some embodiments, if network connectivity is available, method 400 can retrieve trusted code from a remote server (secured via transport layer security, TLS, or similar client-server security protocols).

In some embodiments, methods 200, 300, and 400 are performed using boot image (e.g., software) and hardware signature features and are thus unique to the memory device. Thus, the measurement verification (block 410) can be performed early in the boot process when network access is generally unavailable. Since the golden measurement is securely stored (either in a PCR location or write-protected region) and can only be altered by the owner of the private key corresponding to the public key stored by the memory device, method 400 can be used as a license to operate the memory device since the license will generally disable the entire access to the memory device. Further, since the private key is maintained secretly, only the owner can control the distribution of licenses.

Figure 5:
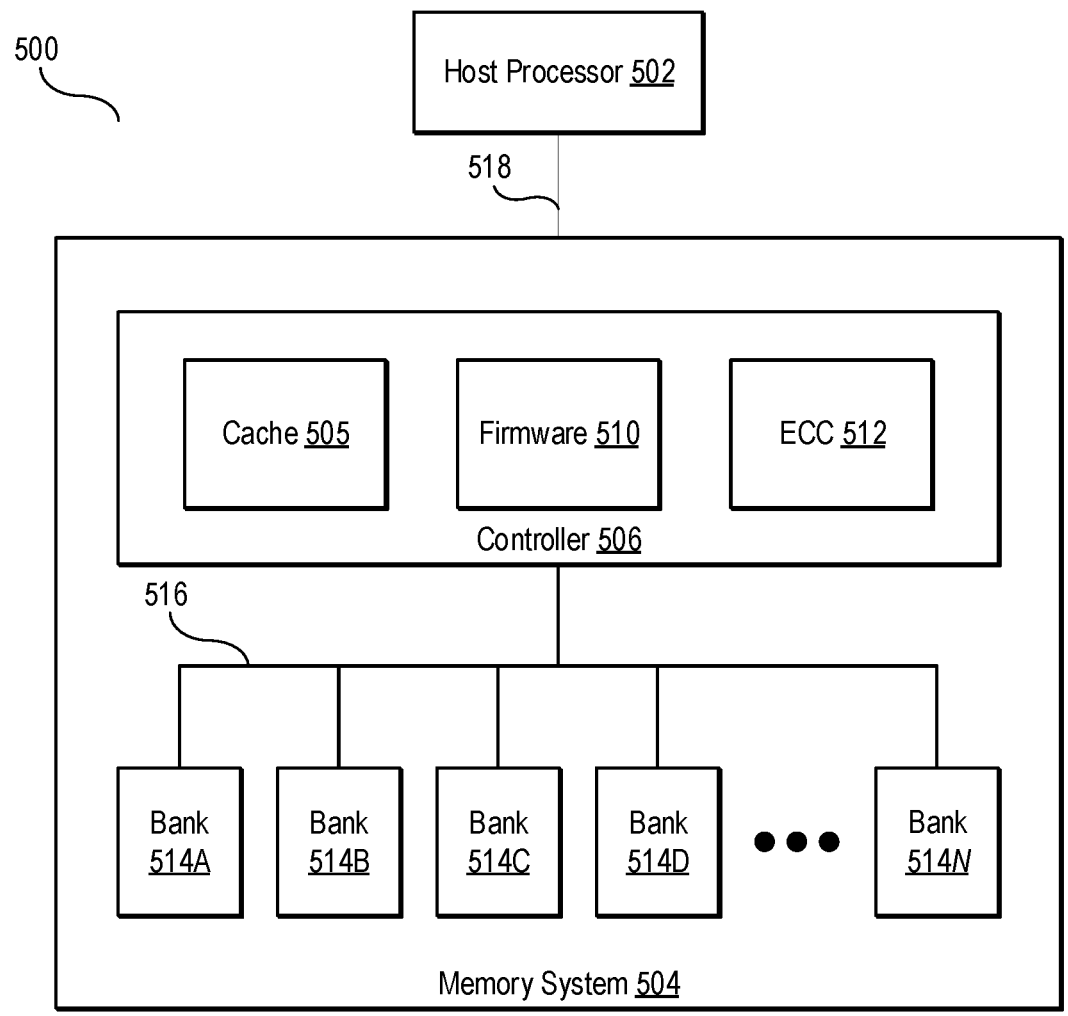
FIG. 5 is a block diagram illustrating a memory system according to some embodiments of the disclosure.

FIG. 5 is a block diagram illustrating a memory system according to some embodiments of the disclosure. Various features of FIG. 5 have been described logically in the description of FIG. 1, and those features are incorporated herein by reference in their entirety.

As illustrated in FIG. 5, a computing system (500) includes a host processor (502) communicatively coupled to a memory system (504) via a bus (518). The memory system (504) comprises a controller (506) communicatively coupled to one or more memory banks (514A-514N), forming a memory array via a bus/interface (516). As illustrated, the controller (506) includes a local cache (505), firmware (510), and an error correction code (ECC) module (512).

In the illustrated embodiment, a host processor (502) can comprise any type of computer processor, e.g., a central processing unit (CPU), graphics processing unit (GPU), or other types of general-purpose or special-purpose computing devices. The host processor (502) includes one or more output ports that allow for the transmission of address, user, and control data between the host processor (502) and the memory system (504). In the illustrated embodiment, this communication is performed over the bus (518). In one embodiment, the bus (518) comprises an input/output (I/O) bus or a similar type of bus.

The memory system (504) is responsible for managing one or more memory banks (514A-514N). In one embodiment, the banks (514A-514N) comprise NAND Flash dies or other configurations of non-volatile memory. In one embodiment, the memory banks (514A-514N) comprise a memory array.

The banks (514A-514N) are managed by the controller (506). In some embodiments, the controller (506) comprises a computing device configured to mediate access to and from banks (514A-514N). In one embodiment, the controller (506) comprises an ASIC or other circuitry installed on a printed circuit board housing the banks (514A-514N). In some embodiments, the controller (506) may be physically separate from the banks (514A-514N). The controller (506) communicates with the banks (514A-514N) over the interface (516). In some embodiments, this interface (512) comprises a physically wired (e.g., traced) interface. In other embodiments, the interface (512) comprises a standard bus for communicating with banks (514A-514N).

The controller (506) comprises various modules (505-512). In one embodiment, the various modules (505-512) comprise various physically distinct modules or circuits. In other embodiments, the modules (505-512) may completely (or partially) be implemented in software or firmware.

As illustrated, firmware (510) comprises the core of the controller and manages all operations of the controller (506). The firmware (510) may implement some or all of the methods described above.

Figure 6:
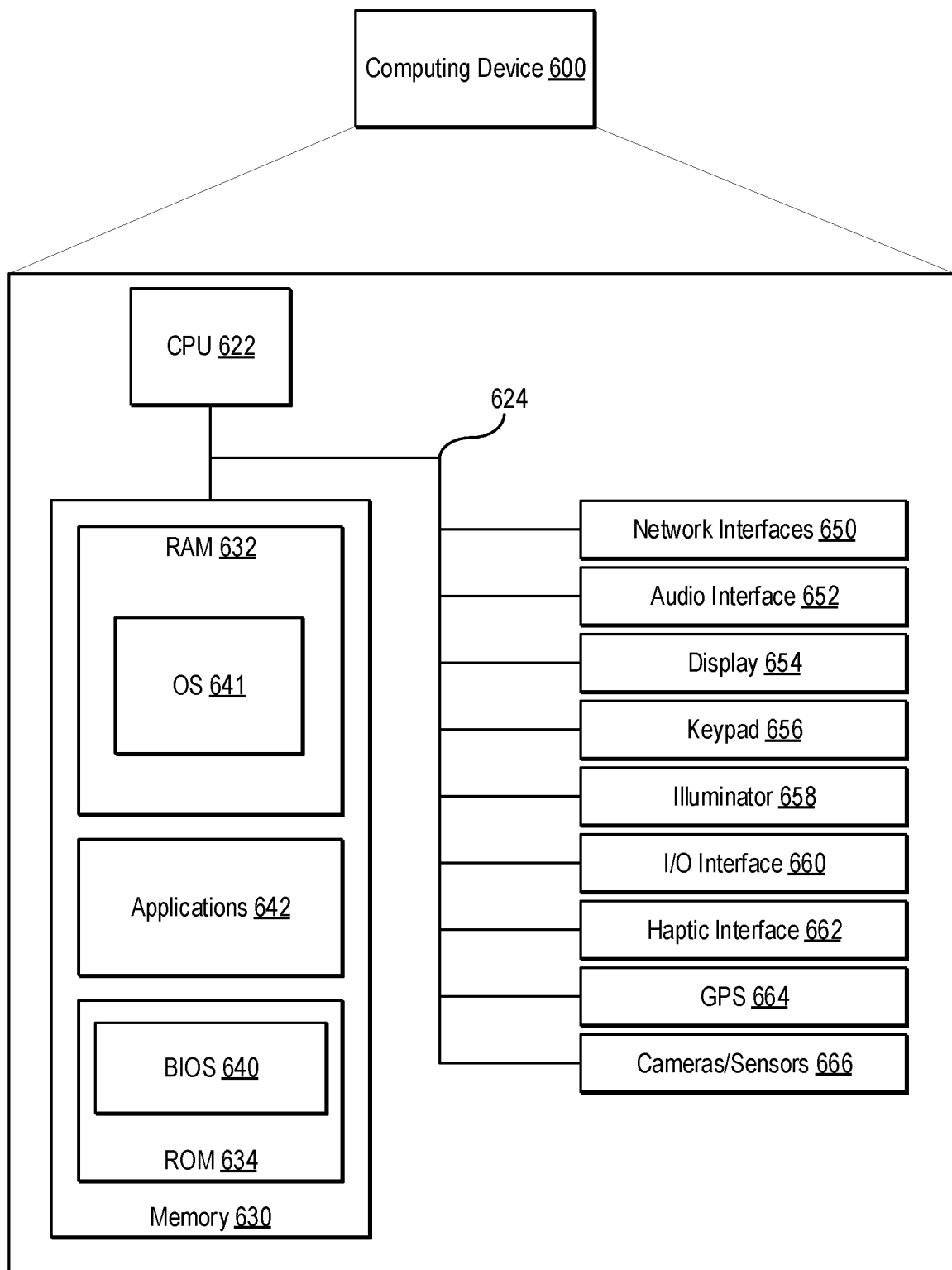
FIG. 6 is a block diagram illustrating a computing device showing an example of a client or server device used in the various embodiments of the disclosure.

FIG. 6 is a block diagram illustrating a computing device showing an example of a client or server device used in the various embodiments of the disclosure.

The computing device (600) can include more or fewer components than those shown in FIG. 6, depending on the deployment or usage of the device (600). For example, a server computing device, such as a rack-mounted server, may not include audio interfaces (652), displays (654), keypads (656), illuminators (658), haptic interfaces (662), Global Positioning System (GPS) receivers (664), or cameras/sensors (666). Some devices can include additional components not shown, such as graphics processing unit (GPU) devices, cryptographic co-processors, artificial intelligence (AI) accelerators, or other peripheral devices.

As shown in the figure, the device (600) includes a central processing unit (CPU) (622) in communication with a mass memory (630) via a bus (624). The computing device (600) also includes one or more network interfaces (650), an audio interface (652), a display (654), a keypad (656), an illuminator (658), an input/output interface (660), a haptic interface (662), an optional global positioning systems (GPS) receiver (664) and a camera(s) or other optical, thermal, or electromagnetic sensors (666). Device (600) can include one camera/sensor (666) or a plurality of cameras/sensors (666). The positioning of the camera(s)/sensor(s) (666) on the device (600) can change per device (600) model, per device (600) capabilities, and the like, or some combination thereof.

In some embodiments, the CPU (622) can comprise a general-purpose CPU. The CPU (622) can comprise a single-core or multiple-core CPU. The CPU (622) can comprise a system-on-a-chip (SoC) or a similar embedded system. In some embodiments, a GPU can be used in place of, or in combination with, a CPU (622). Mass memory (630) can comprise a dynamic random-access memory (DRAM) device, a static random-access memory device (SRAM), or a Flash (e.g., NAND Flash) memory device. In some embodiments, mass memory (630) can comprise a combination of such memory types. In one embodiment, the bus (624) can comprise a Peripheral Component Interconnect Express (PCIe) bus. In some embodiments, the bus (624) can comprise multiple busses instead of a single bus.

Mass memory (630) illustrates another example of computer storage media for the storage of information such as computer-readable instructions, data structures, program modules, or other data. Mass memory (630) stores a basic input/output system ("BIOS") (640) for controlling the low-level operation of the computing device (600). In the illustrated embodiment, the BIOS (640) may be stored in a read-only memory (ROM) such as ROM (634). The mass memory also stores an operating system (641) for controlling the operation of the computing device (600).

Applications (642) can include computer-executable instructions which, when executed by the computing device (600), perform any of the methods (or portions of the methods) described previously in the description of the preceding Figures. In some embodiments, the software or programs implementing the method embodiments can be read from a hard disk drive (not illustrated) and temporarily stored in RAM (632) by CPU (622). CPU (622) can then read the software or data from RAM (632), process them, and store them in RAM (632) again.

The computing device (600) can optionally communicate with a base station (not shown) or directly with another computing device. Network interface (650) is sometimes known as a transceiver, transceiving device, or network interface card (NIC).

The audio interface (652) produces and receives audio signals such as the sound of a human voice. For example, the audio interface (652) can be coupled to a speaker and microphone (not shown) to enable telecommunication with others or generate an audio acknowledgment for some action. Display (654) can be a liquid crystal display (LCD), gas plasma, light-emitting diode (LED), or any other type of display used with a computing device. Display (654) can also include a touch-sensitive screen arranged to receive input from an object such as a stylus or a digit from a human hand.

Keypad (656) can comprise any input device arranged to receive input from a user. Illuminator (658) can provide a status indication or provide light.

The computing device (600) also comprises an input/output interface (660) for communicating with external devices, using communication technologies, such as USB, infrared, Bluetooth®, or the like. The haptic interface (662) provides tactile feedback to a user of the client device.

The optional GPS receiver (664) can determine the physical coordinates of the computing device (600) on the surface of the Earth, which typically outputs a location as latitude and longitude values. GPS receiver (664) can also employ other geo-positioning mechanisms, including, but not limited to, triangulation, assisted GPS (AGPS), E-OTD, CI, SAI, ETA, BSS, or the like, to further determine the physical location of the computing device (600) on the surface of the Earth. In one embodiment, however, the computing device (600) can communicate through other components, provide other information that can be employed to determine the physical location of the device, including, for example, a MAC address, IP address, or the like.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to the desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. Such a computer program can be stored in a computer-readable storage medium, such as but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product or software that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as read-only memory ("ROM"), random access memory ("RAM"), magnetic disk storage media, optical storage media, flash memory components, etc.

In this description, various functions and operations are described as being performed by or caused by computer instructions to simplify the description. However, those skilled in the art will recognize what is meant by such expressions is that the functions result from the execution of the computer instructions by one or more controllers or processors, such as a microprocessor. Alternatively, or in combination, the functions and operations can be implemented using special-purpose circuitry, with or without software instructions, such as using Application-Specific Integrated Circuit (ASIC) or Field-Programmable Gate Array (FPGA). Embodiments can be implemented using hardwired circuitry without software instructions or in combination with software instructions. Thus, the techniques are limited neither to any specific combination of hardware circuitry and software nor to any particular source for the instructions executed by the data processing system.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:
    generating, by a memory device, measurement data associated with the memory device in response to an initial booting of the memory device;
    reading, by the memory device, a golden measurement from a Platform Configuration Register (PCR), the golden measurement generated based on a version of the data associated with the memory device and signed using a private key of a manufacturer of the memory device;
    validating, by the memory device, the golden measurement using a public key, wherein the public key comprises a public key written by the manufacturer to a write-protected region of the memory device;
    determining, by the memory device, whether the golden measurement is equal to the measurement data; and
    continuing, by the memory device, a boot process when the golden measurement is equal to the measurement data.

2. The method of claim 1, further comprising halting the boot process when the golden measurement is not equal to the measurement data.

3. The method of claim 2, further comprising initiating a recovery process after halting the boot process.

4. The method of claim 1, wherein measuring data associated with the memory device comprises measuring one or more of software, firmware, or signature features of the memory device.

5. The method of claim 1, wherein validating the golden measurement comprises reading a digital signature associated with the golden measurement; reading a public key from a write-protected storage area; and validating the digital signature using the public key.

6. The method of claim 1, further comprising determining that the memory device is performing a first boot and enabling an auto measurement capability of a controller of the memory device in response.

7. A non-transitory computer-readable storage medium storing computer program instructions capable of being executed by a controller of a memory device, the computer program instructions defining steps of:
    generating measurement data associated with the memory device in response to an initial booting of the memory device;
    reading a golden measurement from a Platform Configuration Register (PCR), the golden measurement generated based on a version of the data associated with the memory device and signed using a private key of a manufacturer of the memory device;
    validating the golden measurement using a public key, wherein the public key comprises a public key written by the manufacturer to a write-protected region of the memory device;
    determining whether the golden measurement is equal to the measurement data; and
    continuing a boot process when the golden measurement is equal to the measurement data.

8. The non-transitory computer-readable storage medium of claim 7, wherein the computer program instructions define a step of halting the boot process when the golden measurement is not equal to the measurement data.

9. The non-transitory computer-readable storage medium of claim 8, wherein the computer program instructions define a step of initiating a recovery process after halting the boot process.

10. The non-transitory computer-readable storage medium of claim 7, wherein measuring data associated with the memory device comprises measuring one or more of software, firmware, or signature features of the memory device.

11. The non-transitory computer-readable storage medium of claim 7, wherein validating the golden measurement comprises reading a digital signature associated with the golden measurement; reading a public key from a write-protected storage area; and validating the digital signature using the public key.

12. The non-transitory computer-readable storage medium of claim 7, wherein the computer program instructions define a step of determining that the memory device is performing a first boot and enabling an auto measurement capability of a controller of the memory device in response.

13. A memory device comprising:
    a storage array; and
    a controller configured to:
        generate measurement data associated with the memory device in response to an initial booting of the memory device;
        read a golden measurement from a Platform Configuration Register (PCR), the golden measurement generated based on a version of the data associated with the memory device and signed using a private key of a manufacturer of the memory device;
        validate the golden measurement using a public key, wherein the public key comprises a public key written by the manufacturer to a write-protected region of the memory device;
        determine whether the golden measurement is equal to the measurement data; and
        continue a boot process when the golden measurement is equal to the measurement data.

14. The memory device of claim 13, the controller further configured to halt the boot process when the golden measurement is not equal to the measurement data.

15. The memory device of claim 13, wherein measuring data associated with the memory device comprises measuring one or more of software, firmware, or signature features of the memory device.

16. The memory device of claim 13, where invalidating the golden measurement comprises reading a digital signature associated with the golden measurement; reading a public key from a write-protected storage area; and validating the digital signature using the public key.

17. The memory device of claim 13, the controller further configured to determine that the memory device is performing a first boot and enabling an auto measurement capability of a controller of the memory device in response.

* * * * *